Patented Sept. 30, 1924.

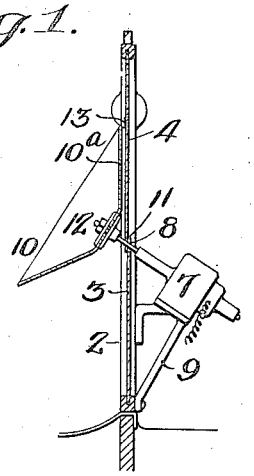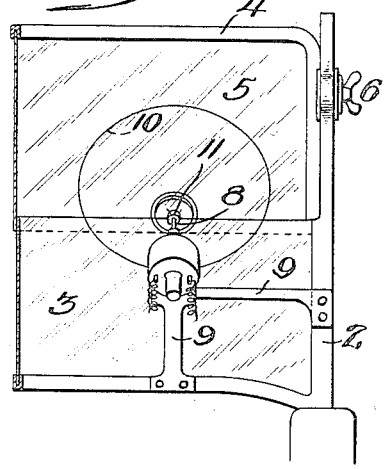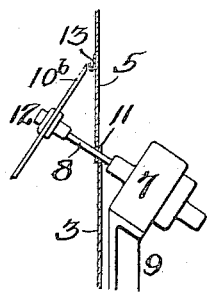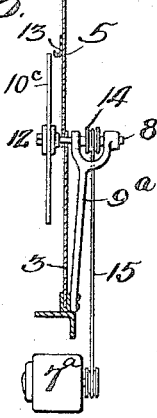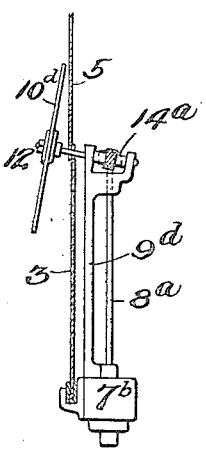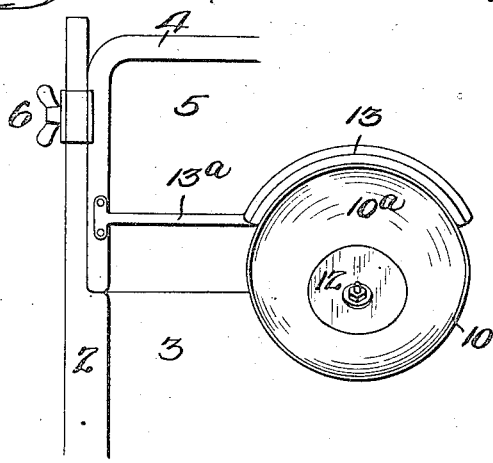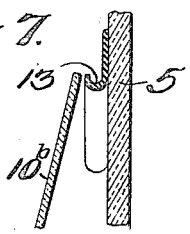

1,510,249

UNITED STATES PATENT OFFICE.

ALFRED L. THOMPSON, OF WOODBOURNE, PENNSYLVANIA.

WINDSHIELD.

Application filed September 28, 1920. Serial No. 413,355.

*To all whom it may concern:*

Be it known that I, ALFRED L. THOMPSON, a citizen of the United States, and resident of Woodbourne, county of Bucks, and State of Pennsylvania, have invented an Improvement in Windshields, of which the following is a specification.

The object of my invention is to provide an automobile wind shield with means adapted, during rainy weather, to preserve a clear vision surface through which a chauffeur may look in guiding the machine.

In carrying my invention into practice, I provide the ordinary wind shield with a revolving disc shaped part of transparent material arranged upon the outside and driven by an electric motor at a high velocity, whereby the water which would otherwise collect is dissipated by centrifugal force, thereby maintaining a practically clear surface. Furthermore, the axle for the revolving disc shaped part is preferably extended through the glass of the wind shield and is driven by an electric motor which may be adapted to the purpose in any convenient manner. It is further desirable that the water flowing down the wind shield shall be diverted from its surface immediately back of the revolving disc or disc shaped part.

My invention also consists of details of construction which, together with the features above enumerated are fully described hereinafter and more particularly defined in the claims.

Referring to the drawings: Fig. 1 is a vertical cross sectional view of a wind shield for automobiles having my invention applied thereto; Fig. 2 is a rear elevation of the same, with part of the wind shield broken away; Fig. 3 is a front view of a portion of my invention at the front of the wind shield; Figs. 4 and 5 are respectively vertical sectional views illustrating modifications of my invention; Fig. 6 is a plan view of another modification; and Fig. 7 is a vertical sectional view to show the relation of the disc, the guard, and the glass of the wind shield.

2 is the frame of the wind shield, 3 is the lower glass plate thereof, 4 is the upper frame carrying the upper glass plate 5 and pivoted or otherwise sustained at 6. The wind shield may be of any ordinary or suitable construction. 7 is an electric motor, secured in position by brackets 9 bolted to the main frame 2, said motor having a shaft 8 extending through the glass of the wind shield and carrying at its outer end a disc shaped part 10, clamped at 12 upon the end of the shaft 8 so as to be removable. In Figs. 1, 2, 4 and 6, the shaft 8 is oblique to the horizontal, so that the disc shaped part revolves in a plane at right angles to the axis of the shaft, the object of which is to lower the motor so as to give a greater area of vision and thereby permit of the use of a smaller disc shaped part. In Fig. 5, the shaft 8 is shown horizontal and the disc shaped part $10^c$ arranged to rotate in a vertical plane or one which is substantially parallel to the glass 3 and 5 of the wind shield. In Fig. 5, the shaft 8 is supported by a bracket $9^a$ and has a grooved wheel 14 which is driven by an endless band 15 and electric motor $7^a$. In Fig. 6, the shaft 8 is oblique and is driven by motor 7 by shaft $8^a$ and spiral gearing $14^a$, the shafts 8 and $8^a$ being journaled in bracket $9^d$ which extends from the motor $7^b$ and is adapted for holding the parts in relative positions.

More specifically referring to Figs. 1, 2 and 3, the disc shaped part 10 is made of dish like construction having the central disk with conical shaped rim $10^a$. The part 10 is preferably made of transparent celluloid so that it is easily molded and is nonbreakable. This construction presents an exposed area $10^a$ of considerable size arranged close to the front of the glass window 5 of the wind shield and through both of which the chauffeur looks for clear vision of the street or road ahead. By the obliquity of the shaft 8 and resulting lowering of the motor, there is no obstruction to looking through the upper half of the disc shaped part 10 and consequently the latter may be made of smaller diameter than would otherwise be necessary. The two plates of glass 3 and 5 of the wind shield may be notched where they meet the shaft 8, as indicated at 11, so that the shaft may rotate freely without contact therewith. If desired, the notch may be wholly in one of the plates of glass and in fact if more desirable to suit any particular make of wind shield, the glass may be perforated specially for the shaft.

In the case of Fig. 4, the disc $10^b$ is shown as a flat circular disc shaped part revolving in a plane inclined to the wind shield; and in practice the inclination may be less than shown, if so desired.

Any water from rain which falls upon the disc shaped part is thrown off by centrifugal force so that the disc shaped part remains clear to the vision. To prevent rain running down upon the surface of the class 5 of the wind shield immediately back of the disc shaped part, a suitable curved guard or gutter of rubber or other material 13 may be applied to the glass and held directly thereon or by an extension to the frame 4 of the wind shield, as shown at 13$^a$, Fig. 3. By this means, the water will be shed to opposite sides of the area of glass 5 in front of which the disc revolves. This gutter or shield 13 may be made of any suitable construction so long as it keeps the water from objectionably blearing the surface of the glass.

Referring to Fig. 6, the disc shaped part 10$^d$ is made to revolve in a plane which is oblique to the vertical plane when looking downward and in this manner the water thrown off by the perimeter of the disc shaped part is caused to escape to one side of the line of vision through glass 5 of the wind shield. As another mode of driving the disc shaped part, I have shown the motor 7$^b$ with a long shaft 8$^a$ arranged to drive the shaft 8 by spiral gears 14$^a$. The bracket 9$^d$ supports the parts in position. This same mode of driving the disc shaped part may be employed in lieu of that shown in Figs. 4 and 5, if so desired.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having thus described my invention, what I claim as new and desire to secure by Letters Patent, is:—

1. An automobile wind shield, combined with a shaft extending through the glass portion of the same, a transparent disc shaped part secured to the shaft in front of the glass of the wind shield, means for supporting and rotating the shaft including a bearing for the shaft independent of and arranged wholly to the rear of the glass of the windshield.

2. The invention according to claim 1, wherein the wind shield glass is provided with a rain shield device arranged adjacent the upper portion of the disc shaped part and wholly between it and the wind shield glass to prevent the rain water flowing down over the wind shield surface immediately back of the disc shaped part.

3. An automobile wind shield, combined with a shaft extending through the glass portion of the same, a transparent disc shaped part secured to the shaft in front of the glass of the wind shield, means for supporting and rotating the shaft including a bearing for the shaft independent of and arranged wholly to the rear of the glass of the wind shield, wherein the wind shield glass is provided with a rain gutter device arranged adjacent to the upper portion of the disc shaped part and wholly between it and the wind shield glass to prevent rain water flowing down over the wind shield surface immediately back of the disc shaped part, and wherein further, the gutter device is in curved form and fixedly held in position close against the wind shield glass and having its groove opening upward and extending to opposite sides of the disc shaped part so as to drain the water beyond the perimeter thereof.

4. The invention according to claim 1, wherein the shaft is arranged obliquely to the plane of the glass of the wind shield and the disc shaped part rotates in a plane obliquely arranged to said glass and at right angles to the shaft.

5. An automobile wind shield, combined with a shaft extending through the glass portion of the same, a transparent disc shaped part secured to the shaft in front of the glass of the wind shield and provided with a conical shaped rim formed with thin transparent walls, means for supporting and rotating the shaft including a bearing for the shaft independent of and arranged wholly to the rear of the glass of the wind shield, said shaft arranged obliquely to the plane of the glass of the wind shield and so that the disc shaped part carried thereon rotates in a plane obliquely to the glass of the wind shield.

6. The invention according to claim 1, wherein the means for rotating the shaft is an electric motor supported in position by a bracket extending from the motor to the frame of the wind shield and said motor directly associated with the shaft and disc shaped part carried thereby.

7. The invention according to claim 1, wherein the wind shield is formed with two glass plates overlapping each other and at their overlapping juncture the glass is cut away to form an opening through which the shaft extends.

8. The invention according to claim 1, wherein further, the shaft is arranged obliquely to the glass of the wind shield and the disc shaped part consists of a central portion secured to the shaft and having its perimeter flaring outwardly in conical shape.

9. The combination of an automobile wind shield, with a disc shaped transparent part arranged at the front of the wind shield and close to the glass thereof, means to rapidly rotate the disc shaped part, and a rain shield extending out from the glass of the wind shield adjacent to the upper peripheral edge of the disc shaped part and wholly between it and the wind shield glass.

In testimony of which invention, I hereunto set my hand.

ALFRED L. THOMPSON.